April 16, 1968   H. E. BEST   3,378,616
METHOD OF FORMING THIN WALLED PLASTIC ARTICLES
Original Filed May 10, 1965   3 Sheets-Sheet 1
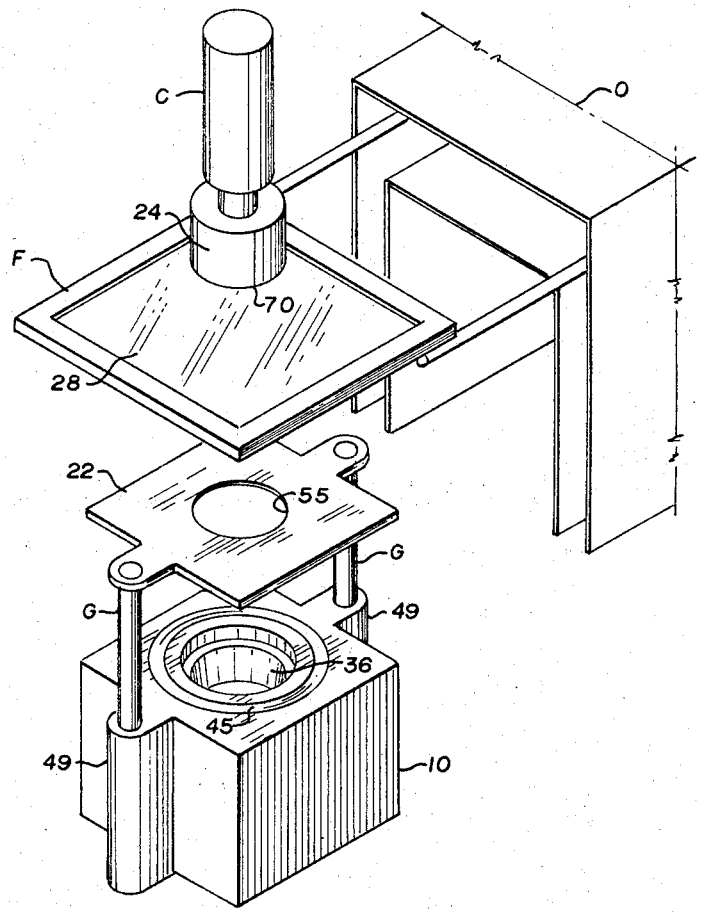
Fig. I
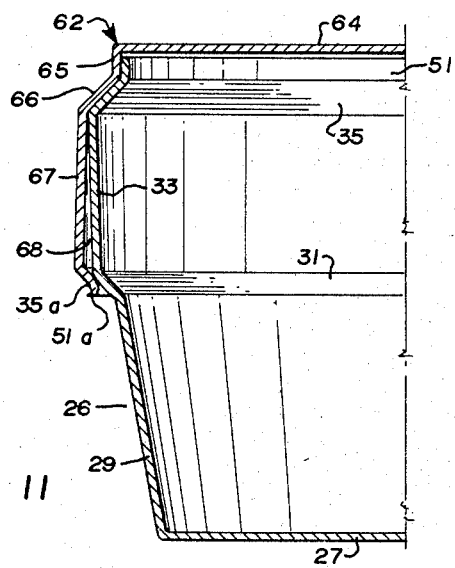
Fig. II
INVENTOR.
Harold E. Best
BY
ATTORNEYS April 16, 1968     H. E. BEST     3,378,616

METHOD OF FORMING THIN WALLED PLASTIC ARTICLES

Original Filed May 10, 1965     3 Sheets-Sheet 2

INVENTOR.
Harold E. Best
BY
ATTORNEYS

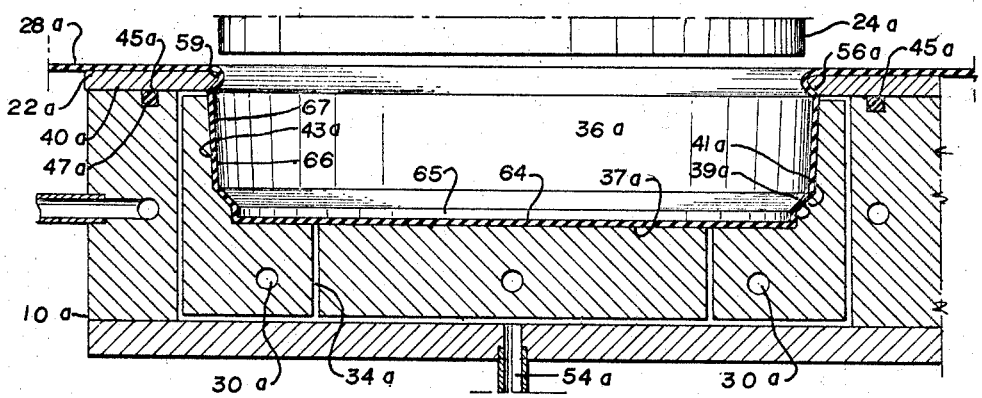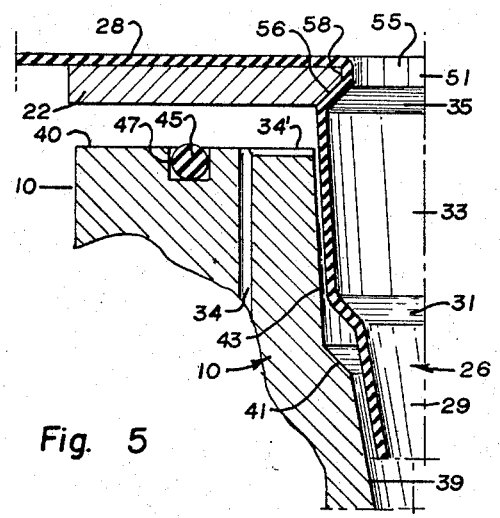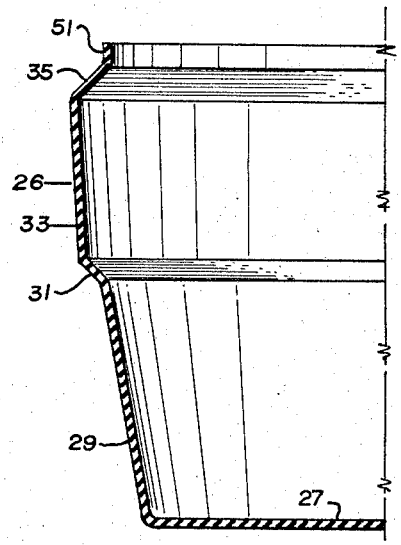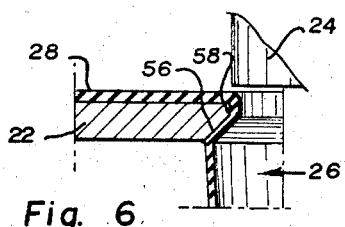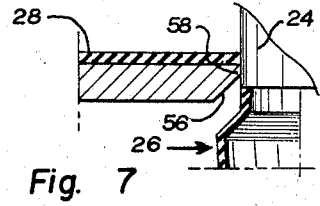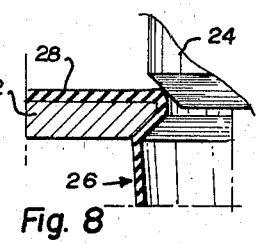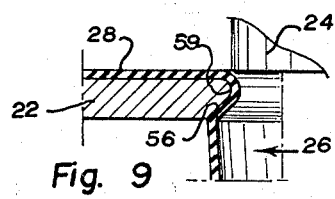

United States Patent Office 3,378,616
Patented Apr. 16, 1968

3,378,616
METHOD OF FORMING THIN WALLED
PLASTIC ARTICLES
Harold E. Best, Grand Junction, Colo., assignor to Best Quality Plastics, Inc., Denver, Colo., a corporation of Colorado
Continuation of application Ser. No. 454,577, May 10, 1965, which is a continuation-in-part of application Ser. No. 62,275, Oct. 12, 1960. This application June 19, 1967, Ser. No. 647,260
2 Claims. (Cl. 264—92)

ABSTRACT OF THE DISCLOSURE

A process of forming an article which comprises the steps of (1) supporting a first portion of a preheated drawable sheet of synthetic resin on a die plate which overlies a mold cavity, has an orifice therein smaller than the mouth of the cavity and is liftable away from said cavity; (2) drawing a second portion of said sheet through said orifice and expanding said second portion to fill the cavity and form an article therein; (3) lifting the first portion of said sheet by the die plate to remove said article from the cavity; and (4) severing the sheet at said orifice to release the article from the die plate.

---

This invention relates to a differential pressure method of molding of synthetic resin sheets into articles. This application is a continuation of my application filed May 10, 1965, Ser. No. 454,577, which in turn is a continuation-in-part of my application filed Oct. 12, 1960, Ser. No. 62,275, now Patent No. 3,290,418, Dec. 6, 1966.

The characteristics of synthetic resins render them ideal for forming thin-wall, three-dimensional, cup-shaped articles by drawing sheets of the same into or upon molds by application of differential air pressure. Perhaps the most common type of such operation is vacuum drawing into a female mold. The basic sequence of operations are as follows: The sheet of resin is restricted to a planar condition by a peripheral frame; heated to a drawing temperature where it becomes highly ductile; placed over the mouth of a mold cavity and pulled into the cavity to assume the configuration of the cavity by application of vacuum within the cavity. Finally, the cooling of the sheet against the walls of the cavity permits it to set to the cavity configuration. Pressure at the opposite side of the cavity can accomplish the same result as a vacuum and, thus, the operation is properly called differential pressure molding, although it is described herein as vacuum forming.

By the method practiced according to this invention both reusable and throw-away types of thin wall containers are manufactured for packaging foodstuffs, hardware items and a variety of other articles. They have evolved as a class of items having specific advantages and also disadvantages over other types of containers, such as glass jars, and to better understand the present invention, certain advantages and disadvantages of these containers, which will be hereinafter called "containers," must be appreciated.

The primary advantage of the present method is the cheapness and the ease with which containers may be manufactured thereby, making them suitable throw-away units on a par with paper cups, but of far better quality. The containers formed by this method are impermeable, cannot be wetted by water, are immune to ordinary temperatures and do not contaminate food. Also, they can be transparent, colored and finished with various ornamental designs if desired.

Accordingly, one of the objects of the invention is to provide a novel and simplified method for forming a container using the general steps of vacuum drawing and including additional steps to provide for the simplified operation of forming an inturned, peripheral flange at the opening of the container.

Another object of the invention is to provide a new process for making articles such as containers out of a preheated drawable sheet of synthetic resin.

Still another object of the invention is to form an article by a method which includes drawing a portion of a preheated sheet of synthetic resin into a mold cavity through a restricted orifice of a die plate which covers the mouth of said mold cavity and then removing such article from the mold.

Yet another object of the invention is to form an article by supporting a first portion of a preheated sheet of synthetic resin on a die plate which overlies the mouth of a mold cavity, is movable away from the mouth of the cavity by lifting and has a restricted orifice therein, drawing a second portion of said sheet of synthetic resin through said restricted orifice and into said mold cavity by vacuum applied to the mold cavity, removing the article formed in the mold cavity, from the mold cavity, by lifting the die plate from the mouth of the mold cavity, and thereafter severing the article so formed from the remainder of the synthetic resin sheet.

Other objects will be in part apparent and in part pointed out specifically hereinafter in connection with the description of the drawings that follows, and in which:

FIGURE 1 is a diagrammatic, isometric view of the primary components of a simple, single-cavity, vacuum-drawing apparatus constructed according to the invention.

FIGURE 4 is a diametrical section, similar to FIG. 3, illustrating the shape and construction of the mold used to form a lid.

FIGURE 5 is a fragmentary sectional detail of a portion of the showing at FIG. 3, but on an enlarged scale illustrating one manner in which the molded article is released from the mold as the die plate is being removed.

FIGURE 6 is a fragmentary sectional detail to an enlarged scale showing the relative positions of the cutting die and die plate preparatory to severing the molded article from the plastic sheet from which it was formed.

FIGURE 7 is a detail similar to FIG. 6, except that the cutting die has moved into the position it occupies following the cutting and trimming operation to completely separate the molded container from the die plate.

FIGURE 8 is a detail similar to FIG. 6, showing the same operation as it is performed on the lid rather than the body, and illustrating specifically another method of shearing the material.

FIGURE 9 is a view similar to FIG. 6, showing another modified form of cutting die.

FIGURE 10 is a fragmentary diametrical section of the completed container.

FIGURE 11 is a fragmentary diametrical section illustrating the completed container with a lid in position.

Figures 2, 3:
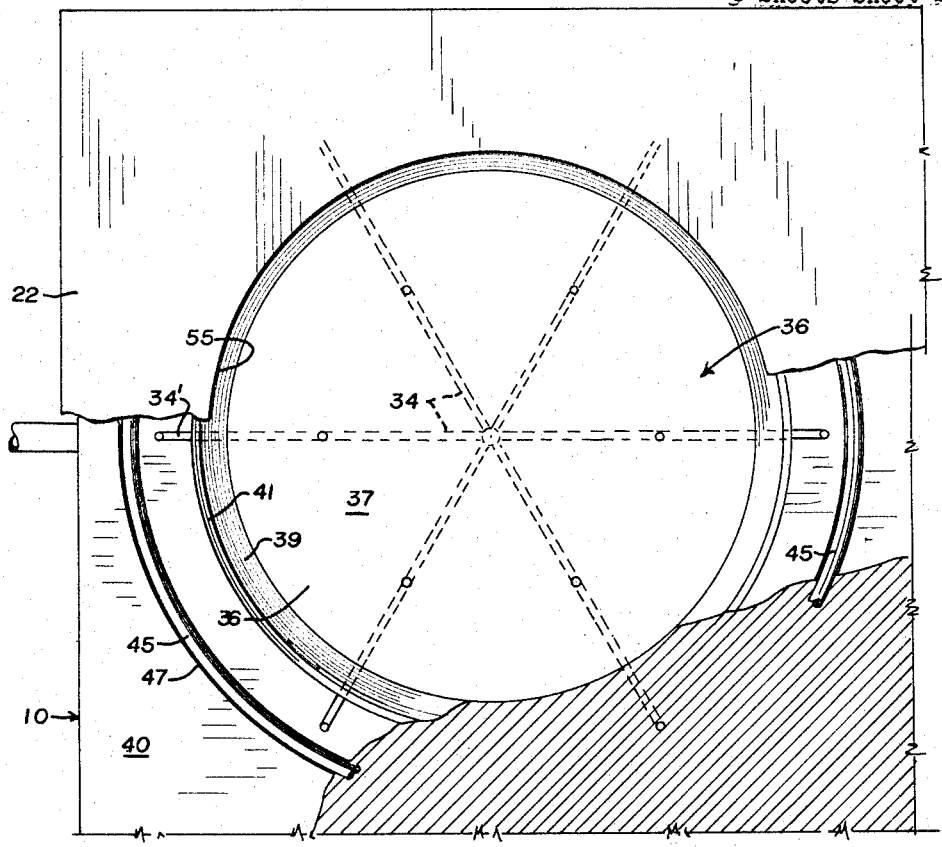
FIGURE 2 is a top plan view of a portion of a mold cavity for forming a container and of a die plate mounted thereon, portions of each being broken away to better show the face mold cavity and a portion of the same in section.
FIGURE 3 is a diametrical section taken along line 3—3 of FIG. 2, but showing, in addition, a container formed therein and a fragment of the cutting die for trimming the molded article in being lowered in position over the die plate.

Referring now to the drawings for a detailed description of the present invention and specifically to FIG. 1 thereof, which illustrates in a diagrammatic manner the several components required for vacuum drawing a container. The resin sheet 28, from which a container is to be formed, is held in a frame F which is adapted to move horizontally as from a first position over a mold M, as illustrated, to a second position within an oven O where the sheet may be heated to a drawing temperature and then returned to the first position. It is then adapted to move vertically to be lowered upon the face of the mold M and to ultimately be drawn into the mold cavity 36.

The mold cavity is formed generally in a body 10, which is covered by a die plate 22, an important feature of the present invention. This die plate is adapted to rest upon the top of the mold body 10 when a container is being formed therein and is adapted to be lifted from the body to release the completed container. A final element is a cutting die 24 which is axially aligned above the die plate to coact with the die plate to cut the container from the resin sheet 28. The cutting die 24 is actuated in any suitable manner, as by movement of a piston carrying the die, and being supported in a cylinder C.

The more specific construction of the mold and die plate and the manner of the association of the cutting die with these elements is illustrated at FIGS. 2 and 3. The mold body 10 is formed with a cavity 36 having the precise shape of the body of a container 26, the cavity opening into the top of this body 10. The die body 10 is conventional in many respects, having cooling conduits 30 through it, a vacuum manifold 54 at the base thereof, and a plurality of vacuum passageways 34 extending from this manifold and to the surface of the cavity 36 at selected locations about this surface. The manifold 54 extends as a passageway to suitable control valves and to a vacuum pump which are not shown, such being of a conventional construction.

The finished container 26 may be of various forms, and as illustrated, it includes a flat bottom 27, a frustoconical wall 29 diverging upwardly from the bottom, an inclined shoulder 31 diverging outwardly from the top of this wall, a nearly cylindrical head ring 33 upstanding from the shoulder, and an inturned sloping reinforcing flange 35 above the ring 33 at the opening of the container. This flange 35 is topped by a short cylindrical lip 51. The two latter features effectively reinforce the opening of the container and permit it to be tightly closed, as will be explained.

The mold cavity 36 is conventional in many respects, being identical in configuration to the finished container 26. It is illustrated as including a floor 37, a lower wall portion 39 which is preferably an inverted frustoconical form flaring upwardly to terminate as a shoulder 41. In the illustrated unit, the shoulder 41 is formed as a comparatively flat, narrow, outwardly-flared, frustoconical section, and a head portion 43 upstands from the outward periphery of the sholder 39. This head portion is also frusto-conical in form but more nearly cylindrical, being flared only at a small angle which is sufficient to permit a container 26, formed within the cavity, to be removed therefrom.

The head ring 33 of the container 26 is adapted to receive the flange of a lid, as will be described, and it may be modified from the nearly cylindrical form illustrated to provide for threads or bayonet-type thread sections. Accordingly, the head portion 43 of the mold, which forms the ring 33, may include retractable undercut portions within the cavity to form such threads; however, such constructions are available and will not be further described since they do not modify the basic concepts of the present invention.

The upper surface 40 of the mold 10, at the top of the head portion 43, is flat and planar and is adapted to receive the die plate 22 thereon. It is contemplated that the contact of the die plate with the surface 40 will not be airtight and an O-ring seal 45 is placed in a groove 47 in this upper surface about die cavity opening, such effectively sealing off the vacuum within the cavity when in use.

One of the most significant and novel features of the mold assembly is the removable die plate 22 which overlies the mold cavity and contacts the O-ring 45 to form a continuous annular seal therewith. The die plate is a flat, rigid member adapted to move upwardly from the mold. For example, it may be carried upon vertically-disposed guide members G which, in turn, are carried within suitably cylindrical sockets 49 in the mold body 10, as illustrated at FIG. 1. The plate 22 moves from a first position directly upon the mold body to a selected position above the mold body which provides for sufficient space to permit removal of containers from the mold.

The die plate is formed with an orifice 55 having a diameter somewhat less than the opening of the cavity at the top of the head portion 43. The under edge of this orifice is chamfered as at 56 which forms, when the die plate is upon the mold, an annular undercut about the head portion of the die. This chamfered portion 56 does not extend to the top of the plate as a feathered edge at the orifice, but intersects a cylindrical upper portion 58 adjacent to the top surface, as most clearly shown at FIGS. 6 and 7. Other constructions are also possible, as where the chamfered portion blends into a rounded portion 59, as illustrated at FIGS. 4 and 8.

This die plate 22 performs several important functions in the mold assembly. First, it provides a supporting surface for the heat-softened plastic resin sheet carried in the frame which is laid over the mouth of the mold during the drawing operation. When the resin sheet is pulled into the cavity by vacuum drawing to form a container 26, the inwardly-directed flange 35 is formed at the mouth of the container by the vacuum pulling the ductile sheet of resin against the chamfer 56. The edge of the container is further rigidified by the pulling of the sheet resin through the orifice and about the cylindrical portion 58 of the plate above the chamfer. This forms the short cylindrical lip 51 above the flange 35 when the container is severed from the resin sheet 28.

To facilitate effective formation of the flange 27, certain vacuum passages 34 extend upwardly through the mold about the cavity to terminate at the top of the mold as lateral depressions 34' under the die plate.

The actual steps of completing the article after it has been formed by drawing into the mold cavity and cooling sufficiently to set, include the severance of the container 26 from the resin sheet 28 from which it was formed, and the removal of the container from the mold cavity 36. FIG. 5 shows the container 26 being lifted out of the mold cavity 36 before it is severed from the resin sheet 28 to show how the die plate may be advantageously used to pull a tightly fitted container from its mold cavity. While such is preferable, the cutting can also be accomplished with the container in place and the die plate setting upon the mold cavity. The cutting die 24 is illustrated at FIG. 1 as being carried in an actuating cylinder C, or the like, which, in turn, is supported upon framework members, not shown. The die 24 is aligned with the orifice 55 of the die plate 22 so that it may move downwardly and into the orifice, and it includes a base cutting edge 70 which is only slightly less than the diameter of the orifice 55 to effect a clean shearing action of the resin sheet from the top of the freshly drawn container.

Because of the softness of the plastic resins used for this purpose, there may be considerable latitude in the construction of the cutting dies and the orifices 55. FIGS. 6 and 7 illustrate an arrangement where a close fit is attained with a direct shearing action, while FIGS. 8 and 9 illustrate a cutting arrangement where a sharp edge of the orifice or of the cutting die presses against a flat surface to sever the sheet resin.

The formation of a container 26 having an inturned flange 35 and a short cylindrical lip 51 at the top of this flange not only increases the strength and rigidity of the mouth portion of the container, but also permits a lid to be formed which tightly fits on the container. Moreover, a lid 62 may be formed of a resin sheet 28a by drawing the same into a mold 10a having a modified cavity 36a therein, as in the construction shown in FIG. 4. This mold body 10a includes cooling passages 30a, a vacuum manifold 54a and vacuum lines 34a, the same as heretofore described. Likewise, the upper surface 40a is flat and planar and includes an annular groove 47a retaining an O-ring seal 45a to support a die plate 22a upon the surface. When the die plate 22a is in position with its orifice 55a over the cavity 36a, a cut-off die 24a is aligned with the orifice 55a, as heretofore described.

The lid 62 is formed with a flat, planar top 64, a short cylindrical wall 65 depending from the periphery of the top, an outwardly flared shoulder 66 depending from the base of the wall, a substantially cylindrical head ring 67 depending from the outer edge of the shoulder 66 and an annular, inwardly sloping reinforcing flange 35a at the base of this ring having a lip 51a, it being understood that the lid is described as being in a normally upright position, as illustrated at FIG. 11, and that the position of the ring as being in the cavity 36a, as shown at FIG. 4, is upside down.

The mold cavity 36a includes a flat floor 37a to form the top 64 of the lid, a short wall portion 39a to form the lid wall 65, a shoulder 41a to form the shoulder 66 of the lid, and a head portion 43a to form the head ring 66. The die plate 22a has the underside of its orifice 55a chamfered at its underside as at 56a to form the reinforcing flange 35a, while the upper portion of this orifice is rounded as at 59 to provide a curled lip 51a at the inner edge of the flange 35a. It is apparent that although of different proportions, the cavities and die plates of FIGS. 3 and 4 are fundamentally the same.

The lid 62 is proportioned to snugly fit upon and over the top of the container 26, as in the manner clearly illustrated at FIG. 11, and the resilience of the lid is relied upon to snap the two tightly together. In this respect, the several types of the synthetic resins from which drawn containers are manufactured are ideal, since the materials are elastic. The short wall 65 may be adapted to tightly fit upon the upstanding container lip 51. The shoulder 66 is sloped and proportioned to overlay and nest upon the inturned reinforcing flange 35 of the container. The head ring 67 lies over the corresponding ring 33 of the container, and it is to be noted that there will be a slight gap 68 at the base of this overlay because of the necessity of sloping the head ring portions of the container and lid to remove them from their respective mold cavities. However, such does not limit the effectiveness of the connection. Finally, the reinforcing flange 35a of the lid nests upon and bears against the underside of the container shoulder 31 to hold the lid upon the container. It is to be noted that the fitting and removal of the lid to and from the container requires that the reinforcing flange 35a of the lid be stretched, and this stretching assures the desired tight fit. The size of this flange may be limited and the lip 51a rounded, as described, to permit the snap-on action without excessively stretching the member. Also, when the short wall 65 is adapted to fit tightly over the lip 51, the sealing of the contents within the container is enhanced.

Although the container and lid constructions have been described as being of a snap-on construction, the obvious variations thereto would permit threads to be formed on the overlying head ring 67 of the lid and the ring 33 of the container so that they may be turned together instead of being snapped together, and that the action of fitting the upstanding lip 51 of the container into the short wall portions 65 of the lid and the nesting of the shoulder 66 upon the reinforcing flange 35 to effect maximum rigidity and sealing action, as above described.

While I have now described my invention in considerable detail, it is obvious that others skilled in the art can build and devise alternate and equivalent constructions, which are nevertheless within the spirit and scope of my invention. Hence, I desire that my protection be limited not by the constructions illustrated and described, but only by the proper scope of the appended claims.

What is claimed is:

1. In the process of drawing a preheated sheet of drawable synthetic resin into a mold cavity of a type having a die plate at the mouth of the cavity with an orifice in the die plate smaller than the cavity mouth and overlying the mouth thereof, the steps including: supporting a first portion of the sheet laterally of the orifice, drawing a second portion of the sheet through the restricted orifice in the die plate and into the mold cavity, expanding the second portion passing therethrough to fill the cavity to form an article therein, lifting the first portion of the sheet by the die plate thereby removing the second portion of said sheet from the mouth of the cavity, and severing the sheet at the restricted orifice to release the formed article from the die plate.

2. In the process set forth in claim 1, including the step of moving a cutoff die into the orifice to shear the mouth of the article at the orifice.

No references cited.

ROBERT F. WHITE, *Primary Examiner.*

A. R. NOE, *Assistant Examiner.*